United States Patent
Dannhäuser et al.

(10) Patent No.: US 11,590,836 B2
(45) Date of Patent: Feb. 28, 2023

(54) MULTIPLE DISC CLUTCH, IN PARTICULAR FOR A HYBRID DRIVE TRAIN

(71) Applicant: Schaeffler Technologies AG & Co. KG, Herzogenaurach (DE)

(72) Inventors: Matthias Dannhäuser, Eisingen (DE); Radmir Ishmuratov, Bühl (DE); Florian Vogel, Bühl (DE); René Daikeler, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/598,950

(22) PCT Filed: Mar. 12, 2020

(86) PCT No.: PCT/DE2020/100186
§ 371 (c)(1),
(2) Date: Sep. 28, 2021

(87) PCT Pub. No.: WO2020/207527
PCT Pub. Date: Oct. 15, 2020

(65) Prior Publication Data
US 2022/0176796 A1 Jun. 9, 2022

(30) Foreign Application Priority Data

| Apr. 10, 2019 | (DE) | .................. | 10 2019 109 418.6 |
| Aug. 1, 2019 | (DE) | .................. | 10 2019 120 833.5 |
| Oct. 10, 2019 | (DE) | .................. | 10 2019 127 238.6 |

(51) Int. Cl.
*F16D 13/52* (2006.01)
*B60K 6/387* (2007.10)
(Continued)

(52) U.S. Cl.
CPC .............. *B60K 6/387* (2013.01); *F16D 13/52* (2013.01); *F16D 13/648* (2013.01); *F16D 13/683* (2013.01); *F16D 13/69* (2013.01)

(58) Field of Classification Search
CPC ....... F16D 13/683; F16D 13/648; F16D 13/52
See application file for complete search history.

(56) References Cited

U.S. PATENT DOCUMENTS

| 2,524,311 A | 10/1950 | Fieux |
| 2002/0117373 A1 | 8/2002 | Kraus et al. |

(Continued)

FOREIGN PATENT DOCUMENTS

| AU | 6199880 A | 3/1981 |
| CN | 1125973 A | 7/1996 |

(Continued)

OTHER PUBLICATIONS

Machine translation of DE102017130350 (Year: 2022).*

*Primary Examiner* — Stacey A Fluhart (57) ABSTRACT

A multiple disc clutch includes an axially displaceable outer disc hooked into an outer disc carrier to provide a first friction surface, and an axially displaceable inner disc hooked into an inner disc carrier to provide a second friction surface for a friction pairing with the first friction surface. The outer disc has an outer coupling element for coupling to the outer disc carrier and the inner disc has an inner coupling element for coupling to the inner disc carrier. The outer disc has an outer ring, the outer coupling element extends radially from the outer ring, and the first friction surface is connected to the outer ring by an outer leaf spring element; or the inner disc has an inner ring, the inner coupling element extends radially from the inner ring, and the second friction surface is connected to the inner ring by an inner leaf spring element.

14 Claims, 6 Drawing Sheets

(51) Int. Cl.
*F16D 13/64* (2006.01)
*F16D 13/68* (2006.01)
*F16D 13/69* (2006.01)

(56) References Cited

U.S. PATENT DOCUMENTS

| | | | | |
|---|---|---|---|---|
| 2003/0234150 | A1* | 12/2003 | Orlamunder | F16D 13/648 |
| | | | | 192/206 |
| 2007/0131515 | A1* | 6/2007 | Vatin | F16D 13/64 |
| | | | | 192/107 C |
| 2015/0275983 | A1* | 10/2015 | Adamczak | F16D 13/68 |
| | | | | 192/200 |
| 2015/0369300 | A1 | 12/2015 | Biermann et al. | |
| 2018/0051754 | A1* | 2/2018 | Lindemann | F16D 13/69 |

FOREIGN PATENT DOCUMENTS

| | | | | |
|---|---|---|---|---|
| CN | 102913561 | A | 2/2013 | |
| CN | 105765256 | A | 7/2016 | |
| CN | 107735590 | A | 2/2018 | |
| CN | 108138862 | A | 6/2018 | |
| CN | 109278527 | A | 1/2019 | |
| DE | 3100586 | A1 | 8/1982 | |
| DE | 3320977 | C1 | 12/1984 | |
| DE | 102008027442 | A1 | 1/2009 | |
| DE | 102008006155 | A1 | 7/2009 | |
| DE | 102018117326 | A1 | 2/2019 | |
| DE | 102017130350 | A1 | 6/2019 | |
| DE | 102017130350 | A1 * | 6/2019 | F16D 13/646 |
| DE | 102018103524 | A1 | 8/2019 | |
| DE | 102019112566 | A1 | 10/2020 | |
| EP | 3164615 | A1 | 5/2017 | |
| FR | 2822908 | A1 | 10/2000 | |
| JP | S5254748 | U | 4/1977 | |
| JP | S54148743 | U | 10/1979 | |
| JP | H0211228 | U | 1/1990 | |
| JP | H0425033 | U | 2/1992 | |
| JP | 2004308894 | A | 11/2004 | |
| WO | 2016148999 | A1 | 9/2016 | |

* cited by examiner

MULTIPLE DISC CLUTCH, IN PARTICULAR FOR A HYBRID DRIVE TRAIN

CROSS-REFERENCE TO RELATED APPLICATIONS

This application is the United States National Phase of PCT Appln. No. PCT/DE2020/100186 filed Mar. 12, 2020, which claims priority to German Application Nos. DE102019109418.6 filed Apr. 10, 2019, DE102019120833.5 filed Aug. 1, 2019, and DE102019127238.6 filed Oct. 10, 2019, the entire disclosures of which are incorporated by reference herein.

TECHNICAL FIELD

The present disclosure relates to a multiple disc clutch with the aid of which an internal combustion engine, e.g., designed as an internal combustion motor, can be selectively coupled to a drive train of a motor vehicle, e.g., in the form of a hybrid motor vehicle.

BACKGROUND

DE 10 2018 103 524 A1 discloses a multiple disc clutch for a hybrid drive train of a motor vehicle, in which the axially displaceable discs used for a friction pairing in a respectively assigned multiple disc carrier are coupled to the assigned multiple disc carrier via offset toothed flanges in a torque-transmitting manner. The toothed flanges, which are offset via a single flange web, can perform an axial relative movement to the friction surfaces of the discs.

SUMMARY

A multiple disc clutch for a drive train of a motor vehicle is provided, having an outer multiple disc carrier for transmitting a torque and a plurality of outer discs which are hooked into the outer multiple disc carrier in an axially displaceable manner for respectively providing a first friction surface. At least one of the outer discs, e.g., each of the outer discs has a, for example, tooth-shaped, outer coupling element for coupling to the outer multiple disc carrier in a torque-transmitting manner. The multiple disc clutch also includes an inner multiple disc carrier for transmitting a torque and a plurality of inner discs which are hooked into the inner multiple disc carrier in an axially displaceable manner for respectively providing a second friction surface for a friction pairing with the first friction surface of an axially adjacent outer disc. At least one of the inner discs, e.g., each of the inner discs, has a, for example, tooth-shaped, inner coupling element for coupling to the inner multiple disc carrier in a torque-transmitting manner.

All of the outer coupling elements project radially to the outside from an outer ring which runs continuously in the circumferential direction, and/or all the inner coupling elements project radially to the inside from an inner ring which runs continuously in the circumferential direction. The first friction surface is connected via at least one outer leaf spring element to the outer ring to provide a resilient axial relative movement of the outer coupling element to the first friction surface, and/or the second friction surface is connected via at least one inner leaf spring element to the inner ring to provide a resilient axial relative movement of the inner coupling element to the second friction surface.

The respective disc can be inserted, i.e., hooked, into a corresponding contouring of the associated multiple disc carrier in an axially displaceable manner via a two-dimensional contouring formed by the respective coupling elements. The outer discs and the inner discs can be arranged alternately one behind the other in the axial direction. The discs can be arranged in the axial direction between an axially fixed counterplate and a pressure plate that can be axially displaced by an actuation system relative to the counterplate and, when the multiple disc clutch is closed, are frictionally pressed between the counterplate and the pressure plate. In this case, the first friction surface and the second friction surface of consecutive discs engage one another and form a friction pairing. The pressure plate and/or the counterplate can also be designed as an outer disc and/or an inner disc.

In the closed state of the multiple disc clutch, a torque can be transmitted between the outer multiple disc carrier and the inner multiple disc carrier via the friction-locked discs and the formed friction pairings. For example, the outer discs are designed as steel discs and the inner discs are designed as lining discs each provided with friction linings on both sides, or the inner discs are designed as steel discs and the outer discs are designed as lining discs each provided with friction linings on both sides. The multiple disc clutch can be designed as a dry multiple disc clutch, in which no coolant or lubricant is used, or as a wet multiple disc clutch, in which the discs contact a coolant and/or lubricant.

The component of the respective disc that forms the coupling elements can be produced from a metal plate, e.g., by punching. As a result, the discs can be produced inexpensively with the aid of thin metal plates. During the torque transmission, the respective coupling elements can engage in a form-locking manner with their narrow side facing in the tangential direction on a contouring of the associated multiple disc carrier designed, for example, as a toothing. The respective disc may be centered in the radial direction on the associated multiple disc carrier via the narrow side facing radially to the inside or radially to the outside in the radial direction. This can lead to a complex mounting of the discs in the associated multiple disc carrier, which can lead to misalignments of the disc and/or jamming in the associated multiple disc carrier, e.g., in unfavorable tolerance conditions. However, due to the axially resilient connection of the friction surfaces with the help of the leaf spring elements, axial compensation can take place in such a situation, so that essentially similar friction conditions can exist in all friction pairings of the multiple disc clutch and unnecessary wear due to force peaks in individual friction pairings is avoided.

The respective leaf spring element can be designed as a metal plate strip, e.g., running essentially tangentially and/or in the circumferential direction, which can be elastically bent in the direction of its surface normal in the axial direction of the multiple disc clutch. The leaf spring element can be connected at one end to the associated ring and at the other end directly or indirectly to the associated friction surface. For example, the end of the respective leaf spring element facing away from the ring can be connected to a fastening region, to which a metal plate or friction lining forming the first friction surface or the second friction surface is fastened.

Since the coupling elements project from a common ring, additional stiffening can be achieved through the ring. A twisting or bending of a coupling element about a radially extending bending axis can thus be avoided or at least reduced. In addition, it is possible to avoid or at least reduce the tilting or bending of a coupling element about a tangentially running tilting axis. The relative position of several coupling elements in the circumferential direction of the disc can remain essentially constant to a greater extent, even under load. A jamming and increased wear of the coupling element can thereby be avoided, so that, for example, particularly high torques can be transmitted via the respective disc without the risk of impairment of the torque transmission or unnecessary wear. The risk of jamming and/or an unfavorable positioning of discs in a multiple disc clutch is reduced by the friction surfaces of the discs which are axially sprung on the continuous ring forming the coupling elements.

The multiple disc clutch is therefore suitable for use as a so-called "K0 clutch" in a hybrid module of a drive train for a hybrid motor vehicle in order to couple a drive shaft of an internal combustion engine with an intermediate shaft coupled to a rotor of an electrical machine, via which intermediate shaft the engine torque generated in the internal combustion engine and/or the electric torque generated in the electrical machine can be transmitted to a motor vehicle transmission. With the aid of the respective stiffening ring, the relative axial movement of the discs between the open and closed position of the multiple disc clutch can take place with reduced friction or mostly without friction. As a result, the multiple disc clutch can, for example, be used unlubricated as a dry multiple disc clutch.

During the transmission of the torque, which takes place when the multiple disc clutch is almost fully or almost completely closed, sliding friction is greater than the axial spring force of the leaf spring element and a friction-prone sliding of the coupling elements on the multiple disc carrier does not occur. Axial relative movement of the friction surface is still possible due to the spring deflection of the leaf spring element, so that, with reduced friction and thus reduced wear, a similar torque transmission can be achieved in the various friction pairings. By increasing the number of coupling elements, the torque to be transmitted can be distributed over correspondingly more coupling elements, and the surface pressure on the tangential narrow sides of the coupling elements can be reduced. In this case, the low spring stiffness of the leaf spring elements in the axial direction of the multiple disc clutch can be aimed for, while at the same time sufficient transmission reliability of the applied torque can be ensured.

The outer coupling elements and the first friction surface may be divided between different interconnected components to form the outer disc, and/or the inner coupling elements and the second friction surface may be divided between different interconnected components to form the inner disc. The respective disc can be composed of a carrier plate having the coupling elements and the leaf spring elements, and a disc having the respective at least one friction surface, e.g., a steel disc to form a steel disc or a friction lining to form a lining disc. The carrier plate can have a fastening region which can be connected in an axially resilient manner via the at least one leaf spring element to the ring forming the coupling elements, and the separate disc can be connected to the carrier plate exclusively via the at least one fastening region. e.g., a plurality of fastening regions, for example by riveting.

The carrier plate is, for example, made in one piece, so that the coupling elements, the ring, the leaf spring elements and the fastening region can be manufactured cost-effectively as a one-piece component by punching out of a metal plate. Alternatively, it is possible to design the carrier plate in several parts, for example in two parts, for example by designing the ring with the coupling elements as a first separate part of the carrier plate and the fastening regions with the leaf spring elements as a second separate part, which are connected to one another, e.g., by riveting. Due to the two-part design, a thicker material can be used in the toothing region, so that the surface pressure is reduced when the torque is transmitted.

In an example embodiment, the outer leaf spring element and/or the inner leaf spring element runs essentially in the circumferential direction and/or in the tangential direction. A longitudinal extension of the respective leaf spring element in the radial direction is avoided, so that tilting of the coupling element about a tangentially running tilting axis can be avoided. In addition, enough space for the leaf spring element can easily be created in the circumferential direction in order to achieve a long longitudinal extension of the leaf spring element, which leads to a correspondingly low spring stiffness. The leaf spring element can have an essentially linear longitudinal extension and/or a curved longitudinal extension that essentially follows the radius.

In an example embodiment, the outer coupling element is connected via at least two, e.g., exactly two, outer leaf spring elements to the first friction surface, and/or the inner coupling element is connected via at least two, e.g., exactly two, inner leaf spring elements to the second friction surface. With more than one leaf spring, tilting, pivoting or radial displacement of the friction surface relative to the associated ring of the disc can be avoided or at least reduced. For example, a fastening region to which the respective friction surface is connected is connected to the ring forming the coupling elements via two leaf spring elements extending away from one another, so that tilting, pivoting or radial displacement of the fastening region can be largely blocked.

In an example embodiment, the outer disc has a completely closed slot which runs essentially in the circumferential direction for the integral formation of the outer leaf spring element with the outer coupling element and/or the inner disc has a completely closed slot which runs essentially in the circumferential direction for the integral formation of the inner leaf spring element with the inner coupling element. The at least one leaf spring element and, optionally, a fastening region for fastening the friction surface, can be separated through the slot at a radial distance from the ring. A one-piece connection is maintained at the same time. Since the slot is not open on one side, but is designed to be completely closed, a freely projecting end for the leaf spring element is avoided, and the directions of movement of the leaf spring element are restricted when a load is applied. This can ensure that the leaf spring element can essentially only be elastically bent in the axial direction. A jamming of the coupling element in a toothing of the associated multiple disc carrier can be avoided.

In an example embodiment, the extension of the outer leaf spring element in the circumferential direction corresponds at least to the extension of the outer coupling element, e.g., at least to twice the extension of the outer coupling element, and/or the extension of the inner leaf spring element in the circumferential direction corresponds at least to the extension of the inner coupling element, e.g., at least to twice the extension of the inner coupling element. Due to the large extension of the leaf spring element compared to the coupling element, a low spring stiffness of the leaf spring element in the axial direction can be achieved. The extension of the leaf spring element can be less than six times, five times or four times the extension of the associated coupling element, for example, so that a corresponding number of leaf spring elements can be distributed on the same radius in the circumferential direction in order to avoid tilting of the friction lining relative to the ring.

In an example embodiment, the outer multiple disc carrier has a regular or irregular internal toothing in a torque-transmitting and axially displaceable holding of the outer coupling elements and/or the inner multiple disc carrier has a regular or irregular external toothing for holding the inner coupling elements in a torque-transmitting and axially displaceable manner. The respective coupling element can engage in the toothing of the assigned multiple disc carrier, e.g., with a loose fit, to produce a torque-transmitting form fit. At the same time, the coupling element can slide and/or be displaced within the toothing in the axial direction to be able to easily follow an axial offset between an open position and a closed position of the multiple disc clutch.

The teeth and recesses of the toothing of the multiple disc carrier can be arranged regularly, i.e., with identical spacing and identical extension in the circumferential direction, so that the respective disc can be hooked into the disc carrier in many different relative rotational positions. If a certain relative angular position between the respective disc and the associated multiple disc carrier is desired, the teeth and depressions of the toothing of the multiple disc carrier can also be arranged irregularly, i.e., with at least partially different spacing and/or extension in the circumferential direction.

The first friction surface or the second friction surface may be formed by a separate friction lining. As a result, either the plurality of outer discs or the plurality of inner discs can be configured as a lining disc, while the corresponding other discs can be configured as steel discs, i.e., free of friction linings. For the lining disc, a carrier disc may be provided, on the two axial sides of which a friction lining is fastened, for example by gluing.

An axial relative movement of the first friction surface relative to the outer coupling element may be based on a starting position with minimal axial spring force of the outer leaf spring element and/or an axial relative movement of the second friction surface relative to the inner coupling element with respect to a starting position with minimal axial spring force of the inner leaf spring element may be permitted in both axial directions or only in one axial direction. In relation to the unloaded starting position, an axial relative movement of the friction surface can be permitted in both axial directions, or only in one axial direction. If relative movement is only to be permitted in one axial direction, an axial stop connected to the friction surface, which can be formed, for example, by a rear side of a friction lining or a projection projecting radially to the outside, can abut axially against the ring carrying the coupling elements, for example. In this way, for example, a friction lining can be prevented from sticking to the previously pressed adjacent disc when the multiple disc clutch is opened, so that unnecessary and wear-prone dragging of the adhered disc can be avoided.

The present disclosure also relates to a drive train for a hybrid motor vehicle having an internal combustion engine for driving the hybrid motor vehicle, an electrical machine for driving the hybrid motor vehicle and a multiple disc clutch which can be designed and further developed as described above, for the optional coupling of a drive shaft of the internal combustion engine to an intermediate shaft coupled to a rotor of the electrical machine. The intermediate shaft may form the rotor of the electrical machine. For example, the outer multiple disc carrier is formed by a rotor cup which, for example, has permanent magnets on its lateral surface facing radially to the outside in order to form the rotor of the electrical machine that interacts with electromagnets of a stator. The inner multiple disc carrier can be formed by a driver rim connected directly or indirectly to the drive shaft of the internal combustion engine, which may be configured as an internal combustion engine. The electrical machine can be operated either in motor mode or in generator mode. The risk of jamming and/or un unfavorable positioning of discs in a multiple disc clutch is reduced by the friction surfaces of the discs of the multiple disc clutch which are axially sprung against the continuous ring forming the coupling elements, so that the drive train is designed to be more wear-resistant and durable.

BRIEF DESCRIPTION OF THE DRAWINGS

In the following, the disclosure is explained by way of example with reference to the accompanying drawings using exemplary embodiments, in which the features shown below can represent an aspect of the disclosure both individually and in combination. In the figures.

DETAILED DESCRIPTION

Figure 1:
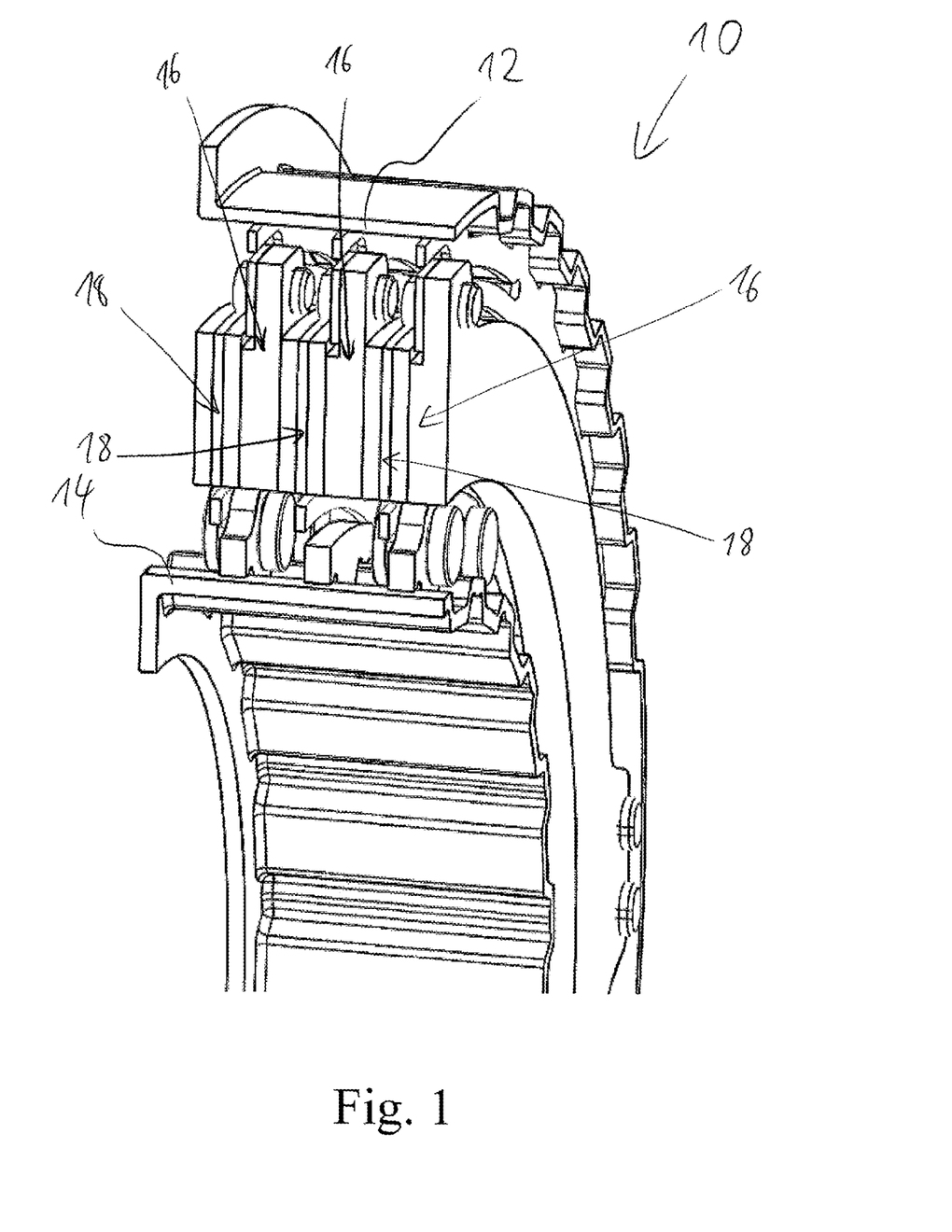
FIG. 1: shows a schematic perspective sectional view of a multiple disc clutch.
Figure 2:
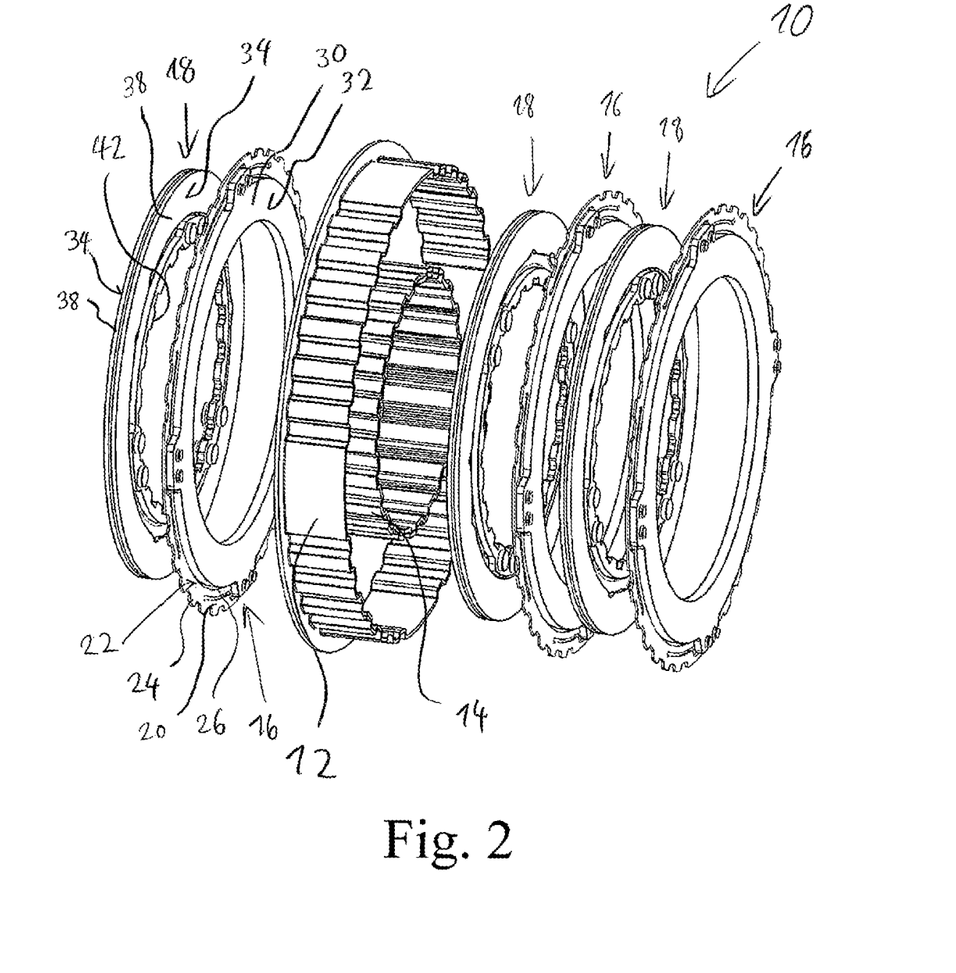
FIG. 2: shows a schematic perspective exploded view of the multiple disc clutch from FIG. 1, FIG. 3: shows a schematic plan view of an inner disc of the multiple disc clutch from FIG. 1, FIG. 4: shows a schematic detail view of a carrier plate of the inner disc from FIG. 3, FIG. 5: shows a schematic plan view of an outer disc of the multiple disc clutch from FIG. 1, FIG. 6: shows a schematic detail view of a carrier plate of the outer disc from FIG. 5, FIG. 7: shows a schematic plan view of an alternative embodiment for an inner disc of the multiple disc clutch from FIG. 1, and FIG. 8: shows a schematic plan view of an alternative embodiment for an outer disc of the multiple disc clutch from FIG. 1.

The multiple disc clutch 10 shown in FIGS. 1 and 2 is designed, for example, as a dry multiple disc clutch which, in a drive train of a hybrid motor vehicle, is intended to optionally transmit a torque generated in an internal combustion engine and/or an electrical machine to a motor vehicle transmission. The multiple disc clutch 10 has an outer multiple disc carrier 12, designed as a rotor cup, and an inner multiple disc carrier 14, designed as a driver ring. Outer discs 16, designed as steel discs, are hooked into the outer multiple disc carrier 12 in a torque-transmitting but axially displaceable manner. Inner discs 18, designed as lining discs, are hooked into the inner multiple disc carrier 14 in a torque-transmitting but axially displaceable manner. Due to the axial displacement of the outer discs 16 and the inner discs 18 towards one another, e.g., with the aid of an actuating system that shifts an axially displaceable pressure plate against an axially fixed counterplate, the discs 16, 18 can form friction pairings via which a torque that is frictionally engaged between the outer multiple disc carrier 12 and the inner multiple disc carrier 14 can be exchanged.

The arrangement of steel and lining discs can, in principle, take place in both directions (inside and outside). In principle, a separate toothing ring 20 can also be attached to both types of discs. Here, as an example, only the case of an internal friction plate with toothing ring 20 in combination with an external steel disc without an additional toothing ring is discussed.

Figure 5:
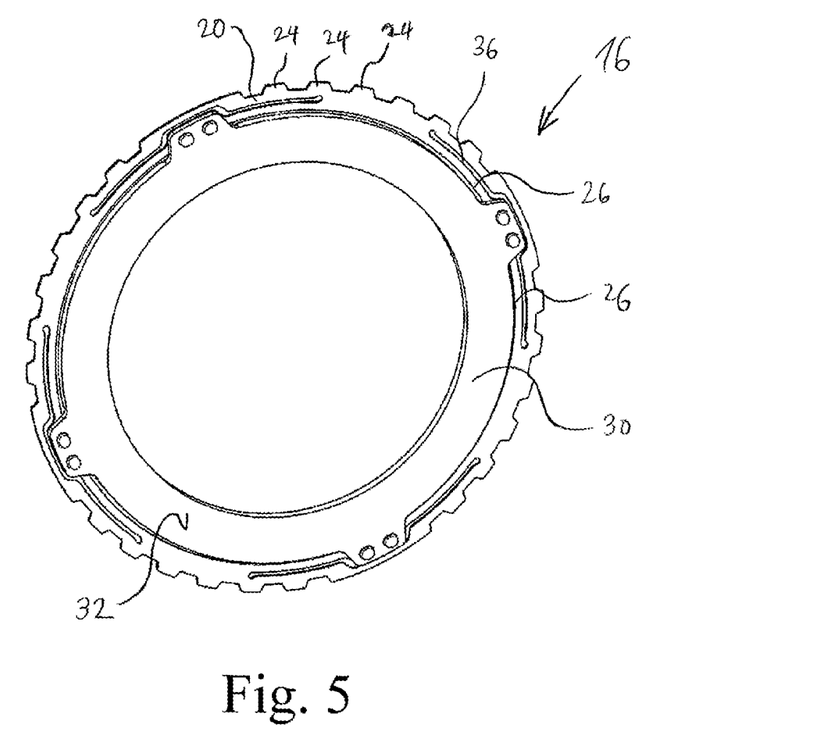
Figure 6:
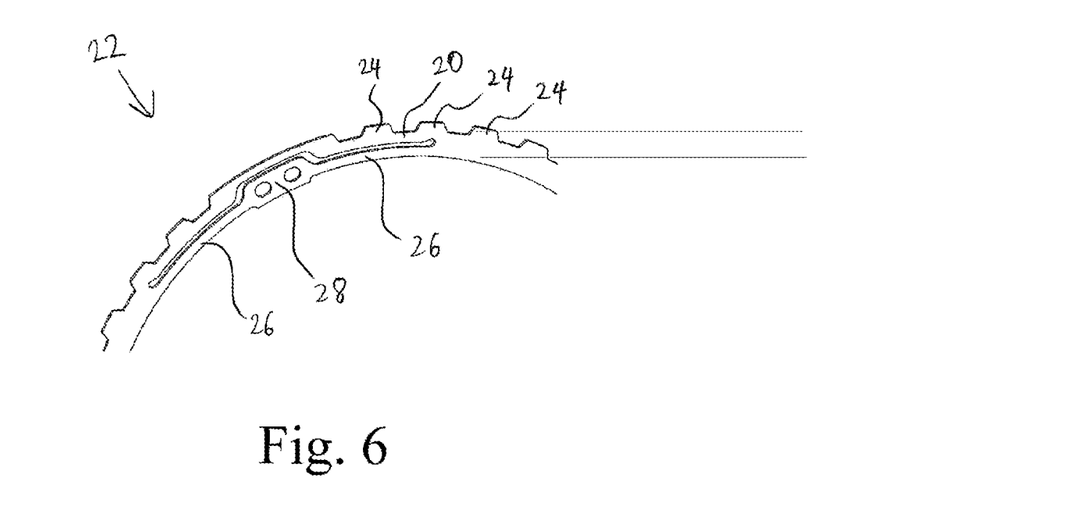

The torque introduced by a rotor of the electrical machine via the outer multiple disc carrier 12 is introduced via a separate carrier plate 22 of the outer disc 16. This carrier plate 22 has a plurality of trapezoidal or tooth-shaped outer coupling elements 24 on the outer diameter, which form a toothing, and engage in a corresponding toothing of the outer multiple disc carrier 12 in a form-locking manner. The toothing ring 20 of the outer disc 16 is designed by an outer ring with outer coupling elements 24 projecting radially to the outside, as shown in FIGS. 5 and 6. Furthermore, the carrier plate 22 has outer leaf spring elements 26 running essentially tangentially and/or in the circumferential direction, of which two outer leaf spring elements 26 each connect a fastening region 28 (ref. FIG. 6). A steel disc 30 is riveted to the fastening region 28. This forms a first friction surface 32 on each of its axial sides in order to form a friction pairing with an axially opposite second friction surface 34 of the inner disc 18.

The toothing ring 20, the outer coupling elements 24, the outer leaf spring elements 26 and the fastening regions 28 are made in one piece and form the carrier plate 22, so that the outer disc 16 in the embodiment shown comprises the carrier plate 22 and the steel disc 30 fastened to the carrier plate 22 by a suitable joining technique. The outer leaf spring elements 26 and the fastening regions 28 can be separated from the rest of the carrier plate 22, i.e., the toothing ring 20 with the outer coupling elements 24, by means of a circumferentially closed slot 36 (ref. FIG. 5), so that only a thin one-piece connection remains between the end of the outer leaf spring elements 26 facing away from the respective fastening region 28 and the toothing ring 20.

When the multiple disc clutch 10 is closed, the steel disc 30 with its first friction surfaces 32 can execute an axial movement relative to the toothing ring 20 due to the axially resilient outer leaf spring elements 26, so that wear-related sliding of the outer coupling elements 24 in the toothing of the outer multiple disc carrier 12 and/or jamming and/or over-positioning can be avoided or at least reduced. Since the rigidity of the outer leaf spring elements 26 is to be kept low, for example, there is no longer any relative movement/sliding friction in the toothing even at a low torque.

Figure 3:
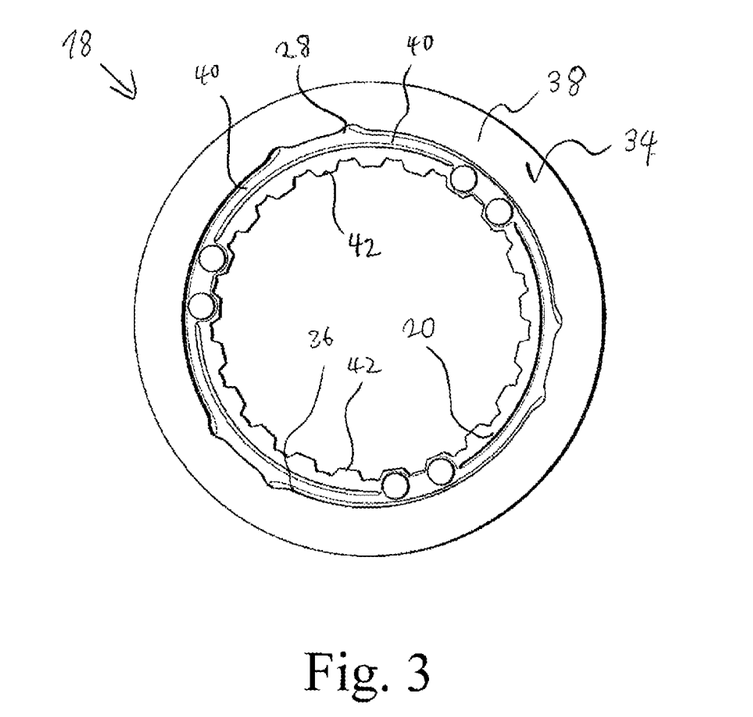
Figure 4:
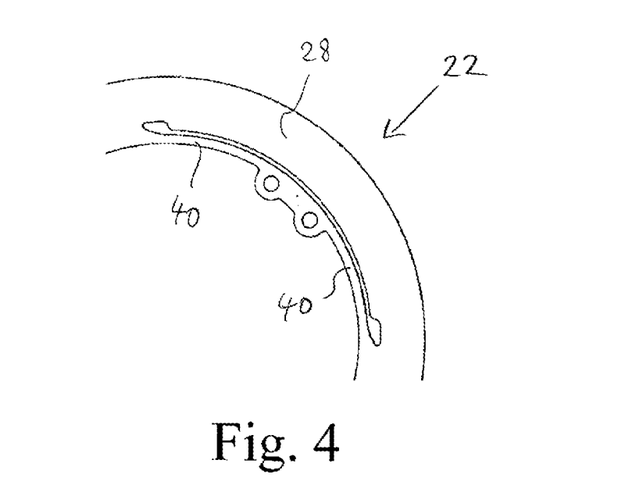

The inner disc 18 can be designed essentially analogously to the outer disc 16. The inner disc 18 transmits the torque from the outer disc 16 to the inner multiple disc carrier 14. The inner disc 18, designed as a lining disc, has friction linings 38 which each form second friction surfaces 34 facing in different axial directions. The friction linings 38 are also connected to a carrier plate 22 (ref. FIG. 4) in that the friction linings 38 are connected, for example riveted and/or glued, to fastening regions 28 connected via inner leaf spring elements 40 (ref. FIG. 3). Depending on the expected surface pressure of the inner coupling elements 42 of the inner disc 18, which are hooked into the inner multiple disc carrier 14 in an axially displaceable manner, the inner coupling elements 42 forming a toothing can either be formed in one piece directly in the carrier plate 22 or, in the case of large coupling torques, for example, also in a separate component, with the toothing ring 20 closed in the circumferential direction and the inner coupling elements 42 fastened separately, e.g., riveted, to the rest of the carrier plate 22. The toothing ring 20 of the inner disc 18 is designed by an inner ring with inner coupling elements 42 projecting radially to the inside.

The carrier plate 22 of the inner disc 18 also has a completely closed slot 36 in order to form the inner leaf spring elements 40 and the fastening regions 24 attached thereto, as shown in FIGS. 3 and 4. By means of the inner leaf spring elements 40, the friction linings 38 together with the second friction surfaces 34 can be displaced in the axial direction relative to the toothing ring 20 with the inner coupling elements 42 and the inner multiple disc carrier 14. The functional principle is essentially identical to that of the outer disc 16.

Figure 7:
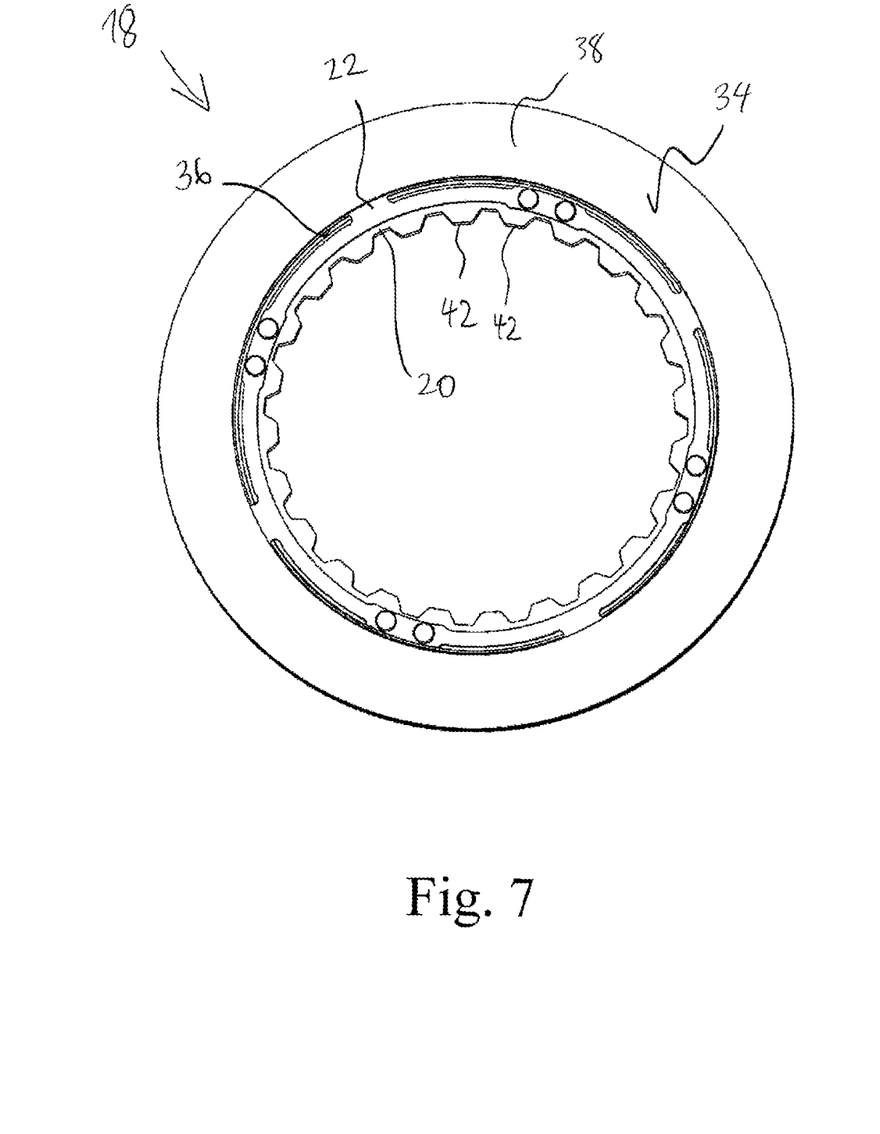
Figure 8:
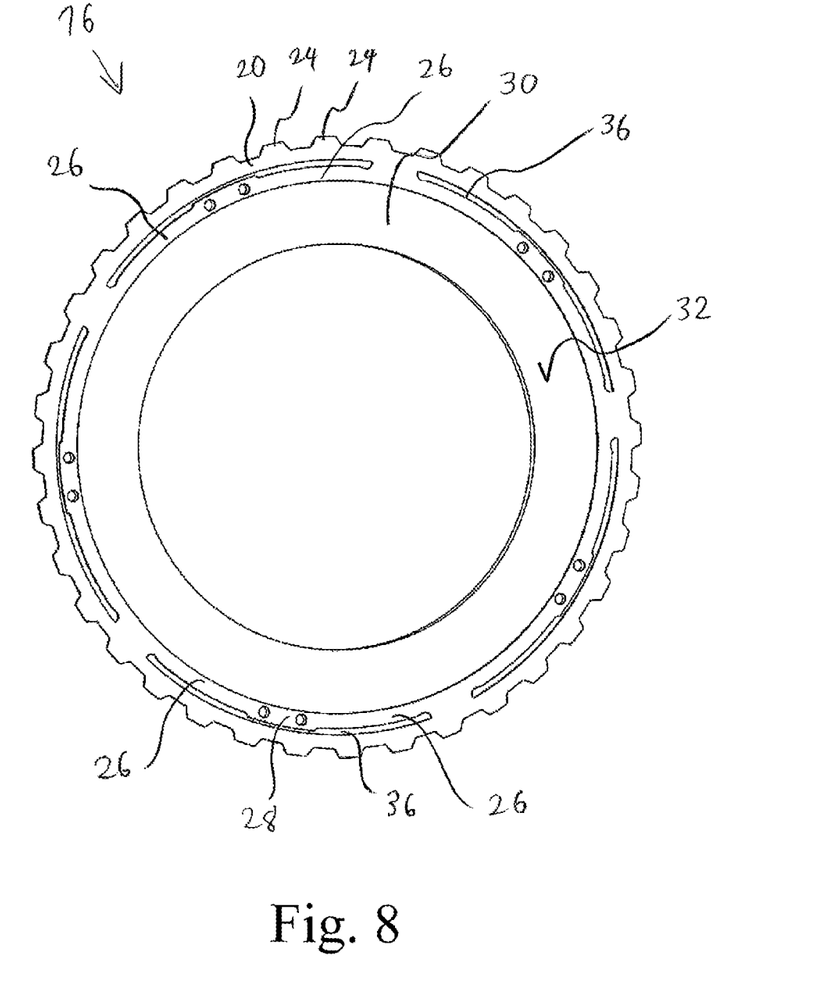

In order to make the multiple disc clutch 10 more space-efficient, there is the possibility of designing the axial springing provided with the aid of the leaf spring elements 26, 40 in the carrier plates 22 so that springing is only possible in one axial direction, as shown in FIGS. 7 and 8. This has the advantage that the toothing pitch circle of the coupling elements 24, 42 can be closer to the friction surface 32, 34. Sliding friction occurring in this variant when opening or closing the multiple disc clutch 10 can, however, be reduced compared to previously known multiple disc clutches from the prior art.

Another possibility to gain installation space (with carrier plates 22 that are resilient on one or both sides) is to not design the toothing formed by the coupling elements 24, 42 completely circumferentially, but to interrupt it at the riveting positions and to design it uneven, as shown in FIGS. 5 and 6. As a result, the rivets and thus also the friction surfaces 32, 34 are closer to the toothing pitch circle of the coupling elements 24, 42. The loss of the contact surface can be taken into account in the design of the surface pressure. The rivets can also be designed with an oval shaft cross-section. No torque is transmitted in the radial direction, so that the cross-section here can be smaller than in the circumferential direction. This leads to an advantage in terms of installation space in the radial direction.

On the inner disc 18 designed as a lining disc, there is the possibility of allowing the inner leaf spring elements 40 of the carrier plate 22 to run into the second friction surface 34. The transition radius between the inner leaf spring elements 40 and the second friction surface 34 represents the most stress-critical point and can therefore be made large. So that this does not require too much installation space, this recess can run into the second friction surface 34 and be covered, for example, by the friction lining 38 or this is cut out somewhat at the corresponding points.

In a drive train for a hybrid motor vehicle, an internal combustion engine designed as an internal combustion motor can be connected to the multiple disc clutch 10 via a drive shaft of the internal combustion engine designed as a crankshaft, formed, for example, as a K0 clutch and/or disconnect clutch for disconnecting and connecting the internal combustion engine from or to the drive train. The torque can be transmitted to the wheels of the motor vehicle via an output shaft that can be connected to the multiple disc clutch 10. The multiple disc clutch 10 may be integrated in a space-saving manner in a rotor of an electrical machine that can be operated in motor mode and/or generator mode, for example.

REFERENCE NUMERALS

10 Multiple disc clutch
12 Outer multiple disc carrier
14 Inner multiple disc carrier
16 Outer disc
18 Inner disc
20 Toothing ring
22 Carrier plate
24 Outer coupling element
26 Outer leaf spring element
28 Fastening region
30 Steel disc
32 First friction surface 34 Second friction surface
36 Slot
38 Friction lining
40 Inner leaf spring element
42 Inner coupling element

The invention claimed is:

1. A multiple disc clutch for a drive train of a motor vehicle, comprising:
an outer disc carrier for transmitting a torque;
an outer disc mounted in the outer disc carrier in an axially displaceable manner to provide a first friction surface, the outer disc comprising an outer coupling element for coupling to the outer disc carrier in a torque transmitting manner;
an inner disc carrier for transmitting the torque; and
an inner disc mounted on the inner disc carrier in an axially displaceable manner to provide a second friction surface for a friction pairing with the first friction surface, the inner disc comprising an inner coupling element for coupling to the inner disc carrier in a torque-transmitting manner, wherein:
the outer disc comprises an outer ring running continuously in a circumferential direction, the outer coupling element extends radially to the outside from the outer ring, and the first friction surface is formed on an outer carrier plate connected to the outer ring by an outer leaf spring element formed integrally from the outer carrier plate that provides a resilient axial movement of the outer coupling element relative to the first friction surface; or
the inner disc comprises an inner ring running continuously in the circumferential direction, the inner coupling element extends radially to the inside from the inner ring, and the second friction surface is formed on an inner carrier plate connected to the inner ring by an inner leaf spring element formed integrally from the inner carrier plate that provides a resilient axial movement of the inner coupling element relative to the second friction surface;
and wherein:
an axial relative movement of the first friction surface relative to the outer coupling element based on a starting position with minimal axial spring force of the outer leaf spring element is permitted in only one axial direction; or
an axial relative movement of the second friction surface relative to the inner coupling element with respect to a starting position with minimal axial spring force of the inner leaf spring element is permitted in only one axial direction.

2. The multiple disc clutch of claim 1 wherein the outer coupling element or the inner coupling element is tooth-shaped.

3. The multiple disc clutch of claim 1, wherein:
the multiple disc clutch comprises a plurality of inner discs and the first friction surface is adjacent to a one of the plurality of inner discs; or
the multiple disc clutch comprises a plurality of outer discs and the second friction surface is adjacent to a one of the plurality of outer discs.

4. The multiple disc clutch of claim 1, wherein:
the outer coupling element and the first friction surface are elements of separate interconnected components that form the outer disc; or
the inner coupling element and the second friction surface are elements of separate interconnected components that form the inner disc.

5. The multiple disc clutch of claim 1, wherein:
the outer leaf spring element extends circumferentially or tangentially; or
the inner leaf spring element extends circumferentially or tangentially.

6. The multiple disc clutch of claim 1, wherein:
a plurality of outer leaf spring elements connects the outer coupling element to the first friction surface; or
a plurality of inner leaf spring elements connects the inner coupling element to the second friction surface.

7. The multiple disc clutch of claim 1, wherein:
exactly two outer leaf spring elements connect the outer coupling element to the first friction surface; or
exactly two inner leaf spring elements connect the inner coupling element to the second friction surface.

8. The multiple disc clutch of claim 1, wherein:
the outer disc comprises a closed circumferential slot for integrally forming the outer leaf spring element with the outer coupling element; or
the inner disc comprises a closed circumferential slot for integrally forming the inner leaf spring element with the inner coupling element.

9. The multiple disc clutch of claim 1, wherein:
a circumferential extension of the outer leaf spring element is at least twice a circumferential extension of the outer coupling element; or
a circumferential extension of the inner leaf spring element is at least twice a circumferential extension of the inner coupling element.

10. The multiple disc clutch of claim 1, wherein:
the outer disc carrier comprises a regular internal toothing or an irregular internal toothing for holding the outer coupling element in a torque-transmitting and axially displaceable manner; or
the inner disc carrier comprises a regular or irregular external toothing for holding the inner coupling element in a torque-transmitting and axially displaceable manner.

11. The multiple disc clutch of claim 1, wherein:
the first friction surface is formed by a separate friction lining; or
the second friction surface is formed by a separate friction lining.

12. The multiple disc clutch of claim 1, wherein:
relative axial movement of the first friction surface relative to the outer coupling element based on a starting position with minimal axial spring force of the outer leaf spring element is permitted in both axial directions; or
relative axial movement of the second friction surface relative to the inner coupling element with respect to a starting position with minimal axial spring force of the inner leaf spring element is permitted in both axial directions.

13. A drive train for a hybrid motor vehicle, comprising:
an internal combustion engine for driving the hybrid motor vehicle, the internal combustion engine comprising a drive shaft;
an electrical machine for driving the hybrid motor vehicle, the electrical machine comprising:
a rotor; and
an intermediate shaft coupled to the rotor; and
the multiple disc clutch of claim 1 for optionally coupling the drive shaft to the intermediate shaft.

14. The drive train of claim 13 wherein the intermediate shaft forms the rotor.

* * * * *